US012766519B2

(12) United States Patent
Goltsev

(10) Patent No.: US 12,766,519 B2
(45) Date of Patent: Oct. 20, 2026

(54) APPARATUSES FOR ITERATIVE EXCHANGE OF LIQUID REAGENTS AND METHODS OF USE THEREOF

(71) Applicant: PARHELIA BIOSCIENCES CORPORATION, Menlo Park, CA (US)

(72) Inventor: Yury Goltsev, Menlo Park, CA (US)

(73) Assignee: Parhelia Biosciences Corporation, Menio Park, CA (US)

(*) Notice: Subject to any disclaimer, the term of this patent is extended or adjusted under 35 U.S.C. 154(b) by 846 days.

(21) Appl. No.: 18/017,796

(22) PCT Filed: Jul. 29, 2021

(86) PCT No.: PCT/US2021/043632
§ 371 (c)(1),
(2) Date: Jan. 24, 2023

(87) PCT Pub. No.: WO2022/026659
PCT Pub. Date: Feb. 3, 2022

(65) Prior Publication Data

US 2024/0017264 A1 Jan. 18, 2024

Related U.S. Application Data

(60) Provisional application No. 63/058,227, filed on Jul. 29, 2020.

(51) Int. Cl.
*B01L 9/00* (2006.01)
*G01N 35/10* (2006.01)

(52) U.S. Cl.
CPC ............ *B01L 9/52* (2013.01); *G01N 35/1011* (2013.01); *B01L 2300/042* (2013.01); *B01L 2300/047* (2013.01); *B01L 2300/0812* (2013.01); *B01L 2300/0822* (2013.01); *B01L 2300/0867* (2013.01); *G01N 2035/103* (2013.01)

(58) Field of Classification Search
None
See application file for complete search history.

(56) References Cited

U.S. PATENT DOCUMENTS 4,190,472 A 2/1980 Slonicki
4,761,381 A * 8/1988 Blatt ................ B01L 3/502738 436/166
4,985,206 A * 1/1991 Bowman ............... G01N 1/312 359/398

(Continued)

OTHER PUBLICATIONS

Alturkistani et al., "Histological Stains: A Literature Review and Case Study", Global Journal of Health Science, 2016, pp. 72-79, vol. 8, No. 3.

(Continued)

*Primary Examiner* — Brian R Gordon
(74) *Attorney, Agent, or Firm* — Thompson Coburn LLP

(57) ABSTRACT

An apparatus for iterative exchange of liquid reagents that enables introduction and removal of liquids within a reaction space. The apparatus supports reagent flow through a channel oriented such that liquid exchange occurs via a higher opening and a lower opening. The configuration facilitates repeated reagent exchange while maintaining sample positioning and minimizing disturbance during use.

12 Claims, 8 Drawing Sheets

(56) References Cited

U.S. PATENT DOCUMENTS

| | | | | |
|---|---|---|---|---|
| 5,188,963 | A * | 2/1993 | Stapleton | B01L 3/5023 436/515 |
| 6,017,495 | A * | 1/2000 | Ljungmann | G02B 21/34 422/65 |
| 7,396,508 | B1 * | 7/2008 | Richards | G01N 1/312 422/537 |
| 7,678,337 | B2 | 3/2010 | Sage et al. | |
| 2003/0049172 | A1 | 3/2003 | Thiem | |
| 2003/0203492 | A1 * | 10/2003 | Sillman | B01L 9/523 422/65 |
| 2005/0064535 | A1 * | 3/2005 | Favuzzi | G01N 35/0099 435/40.5 |
| 2006/0039825 | A1 * | 2/2006 | Yamashita | G01N 15/0272 422/68.1 |
| 2006/0051253 | A1 | 3/2006 | Gausepohl | |
| 2006/0094108 | A1 * | 5/2006 | Yoder | B01L 3/508 435/293.1 |
| 2006/0216744 | A1 * | 9/2006 | Chu | B01L 3/50853 427/2.11 |
| 2013/0071858 | A1 * | 3/2013 | Bui | G01N 1/31 422/62 |
| 2014/0057292 | A1 * | 2/2014 | Honjo | G01N 33/54388 435/7.92 |
| 2015/0205089 | A1 * | 7/2015 | Machida | G02B 21/34 359/391 |
| 2019/0094117 | A1 * | 3/2019 | Guo | G01N 1/312 |
| 2019/0284519 | A1 * | 9/2019 | Kaffka | B01L 9/52 |
| 2019/0368983 | A1 * | 12/2019 | Einsle | B01L 1/025 |
| 2020/0088750 | A1 * | 3/2020 | Reinhardt | B01L 9/52 |
| 2020/0330029 | A1 * | 10/2020 | Chou | G01N 33/53 |
| 2021/0318341 | A1 * | 10/2021 | Oei | G01N 1/4044 |

OTHER PUBLICATIONS

Duerr, "Immunohistochemistry", WormBook: The Online Review of C elegans Biology, Jun. 19, 2006, p. 18-19, Pasadena (CA), USA.

* cited by examiner

180: Optional press plate that exerts pressure on the planar cover (120) and seals the contact between them and the spacer strips (130)

APPARATUSES FOR ITERATIVE EXCHANGE OF LIQUID REAGENTS AND METHODS OF USE THEREOF

CROSS-REFERENCE TO RELATED APPLICATIONS

This application is a U.S. National Stage application under 35 U.S.C. 371 of PCT/US2021/043632 filed Jul. 29, 2021, which claims priority to U.S. Provisional Patent Application No. 63/058,227 filed Jul. 29, 2020, both of which are herein incorporated by reference in their entireties.

BACKGROUND

Histology is the branch of biology which studies the microscopic anatomy of biological tissues, and in some cases, organs or cells. Histology is an important part of anatomical and surgical pathology, as accurate diagnosis of cancer and other diseases can require histopathological examination of tissue samples, which can provide diagnostic information. Histology is also an important part of biological research, with histological techniques providing information in in vitro, ex vivo, and in vivo studies.

SUMMARY

Provided herein are apparatuses for iterative exchange of liquid reagents, the apparatus comprising: at least one semi-open reaction chamber, each semi-open reaction chamber comprising a solid planar cover, at least two parallel spacing strips, and a solid planar support; wherein the at least two parallel spacing strips are affixed on one side to the solid planar support; and the solid planar cover is affixed to same spacing strips on a side opposite the solid planar support, thereby forming a channel comprising a first opening at a first end of the channel and a second opening at a second end of the channel; wherein there is an overhang between the solid planar support and the solid planar cover; at least one rack connected to the reaction chamber, wherein the channel of at least one of the at least one semi-open reaction chamber is at an incline of about 5-85 degrees with respect to the gravity vector of the Earth, with the first opening positioned higher than the second opening. In some embodiments, the solid planar cover comprises a coverslip. In some embodiments, the solid planar cover is removable. In some embodiments, the at least two parallel spacing strips are solid. In some embodiments, the at least two parallel spacing strips comprise a gel. In some embodiments, the at least two parallel spacing strips are made of differential adhesive with a high-tack side facing the planar support and a low-tack side facing the solid planar cover, or vice versa. In some embodiments, the at least two parallel spacing strips are made of the same material as and fused to either the solid planar support or the solid planar cover. In some embodiments, wherein each of the at least two parallel spacing strips has a width of about 0.1 mm to 10 mm. In some embodiments, each of the at least two parallel strips has a thickness of about 5 μm to 500 μm. In some embodiments, the at least two parallel spacing strips are about 5 mm to 50 mm apart. In some embodiments, the channel is flanked by sliders. In some embodiments, the sliders are configured to allow the at least one semi-open reaction chamber to slidably attach to the at least one rack. In some embodiments, a press plate is added on top of the solid planar cover that exerts pressure on the solid planar cover, which helps seals the contact between the spacing strips, the solid planar cover and the solid planar support. In some embodiments, the sliders are configured to slidably attach the semi-open reaction chamber to one of the at least one rack. In some embodiments, the distance between the first opening and the second opening is from 1 mm to 100 mm. In some embodiments, the distance from the solid planar support to the solid planar cover is from 5 μm to 500 μm. In some embodiments, the overhang is from 1 mm to 50 mm long. In some embodiments, the overhang is positioned at the first opening. In some embodiments, the overhang is an overhang of the solid planar support. In some embodiments, the overhang is an overhang of the solid planar cover. In some embodiments, the at least one reaction chamber is not removable from the at least one rack. In some embodiments, the apparatus further comprises at least one open-top container; wherein at least one of the at least one rack is inserted into the at least one open-top container. In some embodiments, the at least one rack is configured to snap into the open-top container. In some embodiments, the at least one rack fits loosely into the open-top container. In some embodiments, the base of the open-top container is from 127 mm to 128 mm long. In some embodiments, the base of the open-top container is from 85 mm to 86 mm wide. In some embodiments, the base of the open-top container is from 10 mm to 250 mm high. In some embodiments, the apparatus further comprises a solid reactive material. In some embodiments, the solid reactive material is affixed to the solid planar support, and wherein the solid reactive material is in the channel. In some embodiments, the solid reactive material is affixed to the solid planar cover, and wherein the solid reactive material is in the channel. In some embodiments, the solid reactive material comprises a biological sample. In some embodiments, the biological sample comprises a tissue sample. In some embodiments, the biological sample comprises a cell. In some embodiments, the biological sample comprises a tumor sample. In some embodiments, the apparatus further comprises a lid having a plurality of perforations; wherein the lid is removably attached to the top of the at least one open-top container. In some embodiments, one of the plurality of perforations is vertically aligned with the first opening of one of the at least one semi-open reaction chamber. In some embodiments, the lid comprises an additional opening. In some embodiments, the additional opening does not vertically align with the planar solid support of any of the at least one semi-open reaction chambers. In some embodiments, the lid further comprises one or more liquid nozzles, each nozzle having an outlet, wherein one of the one or more nozzles are affixed to the lid in a position that allows the outlet end of each nozzle to be vertically aligned with the first opening of one of the at least one semi-open reaction chambers. In some embodiments, the apparatus is further configured to be inserted into an automatic liquid handler comprising at least one movable arm; and at least one liquid dispensing nozzle attached to the at least one movable arm; wherein the automatic liquid handler is equipped to supply the one or more liquids to the first opening. In some embodiments, the at least one movable arm is movable in 1 dimension. In some embodiments, the at least one movable arm is movable in 2 dimensions. In some embodiments, the at least one movable arm is movable in 3 dimensions. In some embodiments, the apparatus is further configured to be inserted into a 3D printer. In some embodiments, the dispensing nozzle is configured to use disposable tips to supply the one or more liquids to the first opening. In some embodiments, the apparatus further comprises a vacuum port affixed to the open-top container. In some embodiments, the apparatus further comprises a waste evacuation channel.

Also provided herein are methods for supplying a liquid reagent using an apparatus provided herein, comprising dispensing a first liquid onto the overhang. In some embodiments, the method further comprises dispensing a second liquid onto the overhang after dispensing the first liquid. In some embodiments, the method further comprises using a vacuum to remove the first liquid after the first liquid exits through the second opening. In some embodiments, the first liquid is a reagent used in a histological protocol.

Also provided herein are kits comprising: at least two parallel spacing strips affixed to one side of a solid planar support; a solid planar cover configured to attach to the at least two parallel spacing strips opposite the solid planar support to form reaction chamber comprising a channel comprising a first opening at a first end of the channel and a second opening at a second end of the channel with an overhang between the solid planar support and the solid planar cover; at least one rack configured to connect to the reaction chamber such that the channel of at least one of the at least one semi-open reaction chamber is at an incline of about 5-85 degrees with respect to the gravity vector of the Earth, with the first opening positioned higher than the second opening. In some embodiments, the solid planar cover comprises a coverslip. In some embodiments, the solid planar cover is affixed to the at least two parallel strips. In some embodiments, the at least two parallel spacing strips are solid. In some embodiments, the at least two parallel strips comprise a gel. In some embodiments, each of the at least two parallel spacing strips has a width of about 0.1 mm to 10 mm. In some embodiments, each of the at least two parallel strips has a thickness of about 5 μm to 500 μm. In some embodiments, the at least two parallel spacing strips are about 5 mm to 50 mm apart. In some embodiments, the channel is flanked by sliders. In some embodiments, the sliders are configured to allow the at least one semi-open reaction chamber to slidably attach to the at least one rack. In some embodiments, the distance between the first opening and the second opening is from 1 mm to 100 mm. In some embodiments, the distance from the solid planar support to the solid planar cover is from 5 μm to 500 μm. In some embodiments, the overhang is from 1 mm to 10 mm long. In some embodiments, the overhang is positioned at the first opening. In some embodiments, the overhang is an overhang of the solid planar support. In some embodiments, the overhang is an overhang of the solid planar cover. In some embodiments, the at least one reaction chamber is affixed to the at least one rack. In some embodiments, the kit further comprises at least one open-top container configured to contain at least one of the at least one rack. In some embodiments, the at least one rack is configured to snap into the open-top container. In some embodiments, the at least one rack is configured to fit loosely into the open-top container. In some embodiments, the open-top container is from 127 mm to 128 mm long. In some embodiments, the open-top container is from 85 mm to 86 mm wide. In some embodiments, the open-top container is from 10 mm to 250 mm high. In some embodiments, the kit further comprises a lid having a plurality of perforations; wherein the lid is configured to removably attach to the top of the at least one open-top container. In some embodiments, one of the plurality of perforations is configured to vertically align with the first opening of one of the at least one semi-open reaction chamber when the lid is attached to the top of the at least one open-top container. In some embodiments, the lid comprises an additional opening. In some embodiments, the additional opening is configured to not vertically align with the planar solid support of any of the at least one semi-reaction chambers. In some embodiments, the lid further comprises one or more liquid nozzles, each nozzle having an outlet, wherein one of the one or more nozzles are affixed to the lid in a position that allows the outlet end of each nozzle to be vertically aligned with the first opening of one of the at least one semi-open reaction chambers.

Also provided herein are computer systems comprising a processor and data storage; storing instructions that, upon execution by the processor, cause the computing device to perform functions comprising: operating a moveable arm configured to deliver liquid to steer the moveable arm to vertically align with a first end of a channel of a semi-open reaction chamber; wherein the semi-open reaction chamber is at an incline of about 5-85 degrees with respect to the gravity vector of the Earth, with the first opening positioned higher than the second opening; delivering liquid from a reservoir to the semi-open reaction chamber through a line guided by the moveable arm.

Also provided herein are systems comprising: an automatic liquid handler; and a computer, wherein the computer is configured to control the automatic liquid handler to deliver a liquid to the overhang. In some embodiments, the automatic liquid handler is configured to siphon a liquid from a reservoir. In some embodiments, the computer is configured to control the automatic liquid handler to deliver a plurality of liquid to the overhang. In some embodiments, the liquid is a reagent for staining a biological substance. In some embodiments, the liquid is a buffer. In some embodiments, the liquid comprises a label. In some embodiments, the liquid comprises an antibody. In some embodiments, the liquid is a reagent for ISH or FISH. In some embodiments, the liquid is a reagent for immunostaining.

Also provided herein are apparatuses for iterative exchange of liquid reagents, the apparatus comprising: at least one reaction chamber, each reaction chamber comprising a cover, at least two spacing strips, and a support; wherein the at least two spacing strips are affixed on one side to the support; and the cover is affixed to the at least two spacing strips on a side opposite the support, forming a channel comprising a first opening at a first end of the channel and a second opening at a second end of the channel; at least one rack supporting the reaction chamber, wherein the channel of at least one of the at least one reaction chamber is at an incline of about 5-85 degrees with respect to the gravity vector of the Earth, with the first opening positioned higher than the second opening. In some embodiments, the at least one reaction chamber is semi-open. In some embodiments, the cover is a solid cover. In some embodiments, the cover is a planar cover. In some embodiments, the cover is a solid planar cover. In some embodiments, the cover is removable. In some embodiments, the at least two spacing strips are parallel. In some embodiments, the at least two spacing strips comprise a gel. In some embodiments, each of the at least two spacing strips has a width of about 0.1 mm to 10 mm. In some embodiments, the at least two spacing strips has a thickness of about 5 μm to 500 μm. In some embodiments, the at least two spacing strips are about 5 mm to 50 mm apart. In some embodiments, the channel is flanked by sliders. In some embodiments, the sliders are configured to allow the at least one reaction chamber to slidably attach to the at least one rack. In some embodiments, the distance between the first opening and the second opening is from 1 mm to 100 mm. In some embodiments, the distance from the solid planar support to the solid planar cover is from 5 μm to 500 μm. In some embodiments, the overhang is from 1 mm to 10 mm long. In some embodiments, the overhang is positioned at the first opening. the overhang is an overhang of the support. In some embodiments, the overhang is an overhang of the support. In some embodiments, the at least one reaction chamber is not removable from the at least one rack. In some embodiments, the apparatus further comprises at least one container; wherein at least one of the at least one rack is inserted into the at least one container. In some embodiments, the at least one container is an open-top container. In some embodiments, the at least one rack is configured to snap into the container. In some embodiments, the container is from 127 mm to 128 mm long. In some embodiments, the container is from 85 mm to 86 mm wide. In some embodiments, the apparatus further comprises a solid reactive material. In some embodiments, the solid reactive material is affixed to the support, and wherein the solid reactive material is in the channel. In some embodiments, the solid reactive material comprises a biological sample. In some embodiments, the biological sample comprises a tissue sample. In some embodiments, the biological sample comprises a cell. In some embodiments, the biological sample comprises a tumor sample. In some embodiments, the apparatus further comprises a lid having a plurality of perforations; wherein the lid is attached to the top of the at least one container. In some embodiments, the lid is removably attached to the top of the at least one container. In some embodiments, one of the plurality of perforations is vertically aligned with the first opening of the at least one semi-open reaction chamber. In some embodiments, the lid comprises an additional opening. In some embodiments, the additional opening does not vertically align with the support of any of the at least one semi-open reaction chambers. In some embodiments, the lid further comprises one or more liquid nozzles, each nozzle having an outlet, wherein one of the one or more nozzles are affixed to the lid in a position that allows the outlet end of each nozzle to be vertically aligned with the first opening of one of the at least one semi-open reaction chambers. In some embodiments, the apparatus is further configured to be inserted into an automatic liquid handler comprising: at least one movable arm; and at least one liquid dispensing nozzle attached to the at least one movable arm; wherein the automatic liquid handler is equipped to supply the one or more liquids to the first opening. In some embodiments, the at least one movable arm is movable in 1 dimension. In some embodiments, the at least one movable arm is movable in at least 2 dimensions. In some embodiments, the at least one movable arm is movable in at least 3 dimensions. In some embodiments, the apparatus is further configured to be inserted into a 3D printer. In some embodiments, the dispensing nozzle is configured to use disposable tips to supply to one or more liquids to the first opening. In some embodiments, the apparatus further comprises a vacuum port affixed to the container. In some embodiments, the apparatus further comprises a waste evacuation channel.

Also provided herein are methods for supplying a liquid reagent using an abovementioned apparatus, comprising dispensing a first liquid onto the overhang. dispensing a second liquid onto the overhang after dispensing the first liquid. In some embodiments, the method further comprises using a vacuum to remove the first liquid after the first liquid exits through the second opening. In some embodiments, the first liquid is a reagent used in a histological protocol.

Also provided herein are racks configured to support at least one reaction chamber having a channel comprising a first opening and a second opening at an incline of about 5-85 degrees with respect to the gravity vector of the Earth, with the first opening positioned higher than the second opening; and wherein the channel is configured to allow capillary flow of liquid reagents. In some embodiments, the at least one reaction chamber is semi-open. In some embodiments, the at least one reaction chamber is a reaction chamber provided of an abovementioned apparatus.

Also provided herein are methods for supplying a liquid reagent using an apparatus of this disclosure, comprising dispensing a first liquid onto an overhang of the first opening.

In some embodiments, the method further comprises dispensing a second liquid onto the overhang after dispensing the first liquid. In some embodiments, the method further comprises using a vacuum to remove the first liquid after the first liquid exits through the second opening. In some embodiments, the first liquid is a reagent used in a histological protocol.

Also provided herein are apparatuses for iterative exchange of liquid reagents, the apparatus comprising: at least one reaction chamber having a channel comprising a first opening and a second opening supported by a rack at an incline of about 5-85 degrees with respect to the gravity vector of the Earth; wherein the channel is configured to allow capillary flow of liquid reagents. In some embodiments, the at least one reaction chamber is a reaction chamber provided in an abovementioned apparatus.

Also provided herein are methods for supplying a liquid reagent using an abovementioned apparatus, comprising dispensing a first liquid onto an overhang of the first opening. In some embodiments, the method further comprises dispensing a second liquid onto the overhang after dispensing the first liquid. In some embodiments, the method further comprises using a vacuum to remove the first liquid after the first liquid exits through the second opening. In some embodiments, the first liquid is a reagent used in a histological protocol.

Also provided herein are kits comprising: a rack comprising an attachment feature configured to attach a reaction chamber having a channel comprising a first opening and a second opening to the attachment feature at an incline of about 5-85 degrees with respect to the gravity vector of the Earth; and instructions for iteratively providing at least two liquid reagents to the first opening; wherein said at least two liquid reagents contact a reactive material in the reaction chamber. In some embodiments, the instructions are provided on an electronic medium. In some embodiments, the instructions further comprise instructions for using liquid handler to deliver the reagents.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Repeated manual application of liquid reagents can be tiresome and time consuming, and automated methods for iterative exchange of such liquid reagents can make such processes easier, faster, or more accurate. Present apparatuses and methods for iterative exchange of liquid reagents, for example onto a slide for histological purposes, can be cost prohibitive for small academic or industrial laboratories. Apparatuses provided herein and their methods of use can be produced at a reduced cost compared with current systems, and can be made widely available to laboratories.

Apparatuses provided herein can comprise a rack and in some cases a reaction chamber that can be used in conjunction with a separate automated liquid handler. In some embodiments, the reaction chamber can be held at an angle in the rack, which can be placed in the range of a liquid handler for dispensing of liquids. Apparatuses and reaction chambers can be interchanged with each other and with different liquid handlers for a variety of uses.

Apparatus

Figure 1A:
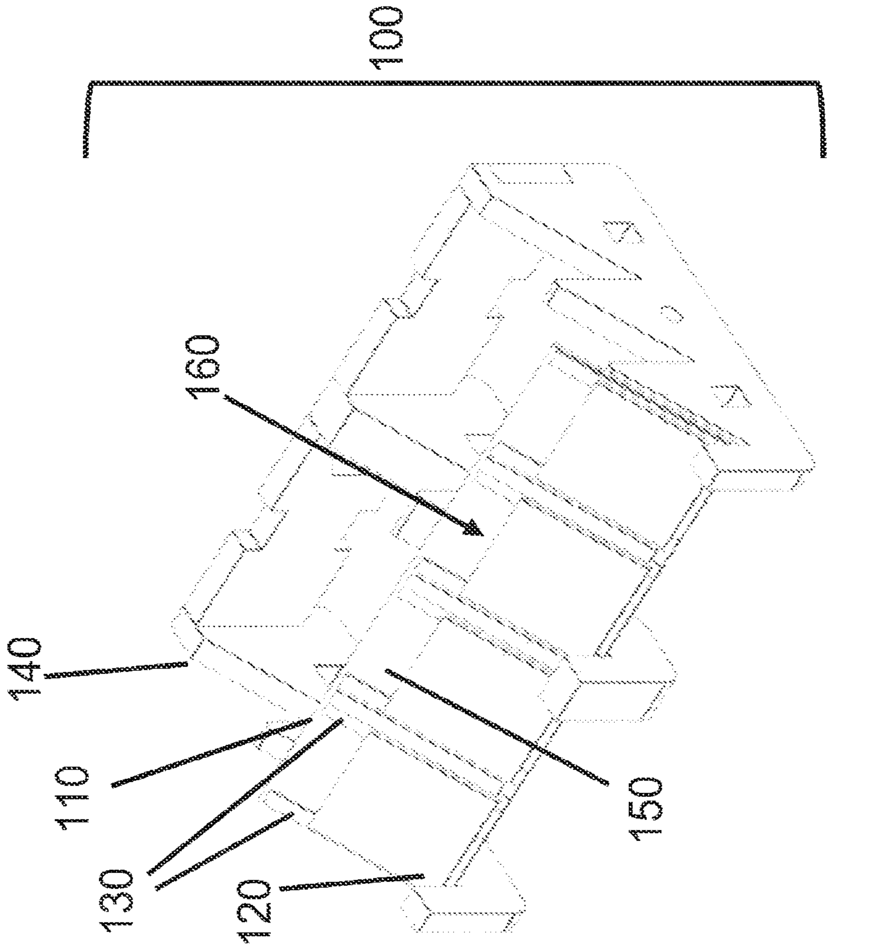
FIG. 1*a* illustrates a schematic of a rack holding a plurality of reaction chambers at an angle.

Provided herein are apparatuses for supplying liquid reagents comprising at least one reaction chamber (e.g., a semi-open reaction chamber) and at least one rack. An example of a rack with reaction chamber, such as a semi-open reaction chambers 100 is provided in FIG. 1*a*. Further views of the reaction chamber(s) are provided in FIG. 1*b* and FIG. 1*c*. In some embodiments, apparatuses provided herein can provide liquid reagents to a sample. For example, an apparatus can provide liquid reagents for staining, histological analysis, or another type of analysis to a biological sample immobilized on a slide.

In some embodiments, a semi-open reaction chamber can comprise a support. A support can be solid. In some embodiments, a support can be planar. In some embodiments, a support can be a solid planar support (e.g., 110). A support can comprise a solid material. A support can comprise a polymer, glass, plastic, metal, or another solid material. In some embodiments, a support can comprise a film or a gel. In some embodiments, a support can be configured to receive a sample. For example, a support can be a slide, such as a histology slide.

In some embodiments, a reaction chamber can comprise at least two spacing strips 130. In some embodiments, the at least two spacing strips can be parallel. The at least two spacing strips can be affixed to one side of the support 110.

The at least two spacing strips can be solid. In some embodiments, the at least two spacing strips can be plastic, metal, glass or another solid material.

The at least two spacing strips can comprise a gel. In some embodiments, the at least two spacing strips can be gel applied to the solid planar support. In some embodiments, the at least two spacing strips can comprise a gel layered on a solid. In some embodiments, the gel can be cured, dried, or solidified.

In some embodiments, the at least two spacing strips may comprise or made of an adhesive. In some embodiments, the at least two spacing strips may comprise or made of a differential adhesive. The at least two spacing strips may comprise a with a high-tack side facing the planar support and a low-tack side facing the planar cover. The at least two spacing strips may comprise a with a low-tack side facing the planar support and a high-tack side facing the planar cover.

In some embodiments, the at least two spacing strips may be made of the same material as the solid planar support or the solid planar cover. The at least two spacing strips may be fused to either of the solid planar support or the solid planar cover. The at least two parallel spacing strips may be made of the same material as and fused to either the solid planar support or the solid planar cover.

The at least two spacing strips can have a specified width. In some embodiments, the at least two spacing strips can each have the same width. In some cases, each of the at least two spacing strips can have a width of at least about 0.05 mm, at least about 0.1 mm, at least about 0.5 mm, at least about 1 mm, at least about 2 mm, at least about 3 mm, at least about 4 mm, at least about 5 mm, at least about 10 mm, at least about 15 mm, or at least about 20 mm. In some cases, each of the at least two spacing strips can have a width of not more than about 0.05 mm, not more than about 0.1 mm, not more than about 0.5 mm, not more than about 1 mm, not more than about 2 mm, not more than about 3 mm, not more than about 4 mm, not more than about 5 mm, not more than about 10 mm, not more than about 15 mm, or not more than about 20 mm. In some cases, each of the at least two spacing strips can have a width of about 0.05 mm, about 0.1 mm, about 0.5 mm, about 1 mm, about 2 mm, about 3 mm, about 4 mm, about 5 mm, about 10 mm, about 15 mm, about 20 mm, or a range between any two foregoing values. For example, each of the at least two spacing strips can have a width of about 0.1 mm to 10 mm.

The at least two spacing strips can have a specified thickness. In some embodiments, the at least two spacing strips can each have the same thickness. In some cases, each of the at least two spacing strips can have a thickness of at least about 1 μm, at least about 5 μm, at least about 10 μm, at least about 25 μm, at least about 50 μm, at least about 75 μm, at least about 100 μm, at least about 200 μm, at least about 300 μm, at least about 400 μm, at least about 500 μm, at least about 1 mm, at least about 2 mm, at least about 3 mm, at least about 4 mm, or at least about 5 mm. In some cases, each of the at least two spacing strips can have a thickness of not more than about 1 μm, not more than about 5 μm, not more than about 10 μm, not more than about 25 μm, not more than about 50 μm, not more than about 75 μm, not more than about 100 μm, not more than about 200 μm, not more than about 300 μm, not more than about 400 μm, not more than about 500 μm, not more than about 1 mm, not more than about 2 mm, not more than about 3 mm, not more than about 4 mm, or not more than about 5 mm. In some cases, each of the at least two spacing strips can have a thickness of about 1 μm, about 5 μm, about 10 μm, about 25 μm, about 50 μm, about 75 μm, about 100 μm, about 200 μm, about 300 μm, about 400 μm, about 500 μm, about 1 mm, about 2 mm, about 3 mm, about 4 mm, about 5 mm, or a range between any two foregoing values. For example, each of the at least two spacing strips can have a thickness of about 5 μm to about 500 μm.

The at least two spacing strips can be spaced apart from each other. In some embodiments, the at least two spacing strips can be spaced at least 1 mm apart, at least 2 mm apart, at least 3 mm apart, at least 4 mm apart, at least 5 mm apart, at least 10 mm apart, at least 20 mm apart, at least 30 mm apart, at least 40 mm apart, at least 50 mm apart, or at least 100 mm apart. In some embodiments, the at least two spacing strips can be spaced not more than 1 mm apart, not more than 2 mm apart, not more than 3 mm apart, not more than 4 mm apart, not more than 5 mm apart, not more than 10 mm apart, not more than 20 mm apart, not more than 30 mm apart, not more than 40 mm apart, not more than 50 mm apart, or not more than 100 mm apart. In some embodiments, the at least two spacing strips can be spaced about 1 mm apart, about 2 mm apart, about 3 mm apart, about 4 mm apart, about 5 mm apart, about 10 mm apart, about 20 mm apart, about 30 mm apart, about 40 mm apart, about 50 mm apart, about 100 mm apart, or a range between any two foregoing values. For example, the at least two spacing strips can be about 5 mm to 50 mm apart.

In some embodiments, a reaction chamber can comprise a cover 120. A cover can be a solid cover. A cover can be a planar cover. In some embodiments, a cover can be a solid planar cover. The cover can be affixed to the at least two spacing strips on a side of the at least two spacing strips opposite the support. In some cases, a channel can be formed comprising a first opening at a first end of the channel, and a second opening at a second end of the channel. A cover can be removable or permanently attached to the reaction chamber. In some embodiments, a cover can be configured to snap on the reaction chamber, to be placed on to the reaction chamber, to slide on to the reaction chamber, to be latched onto the reaction chamber, to be hinged on to the reaction chamber, or otherwise attached or attachable to the reaction chamber.

Figure 1B:
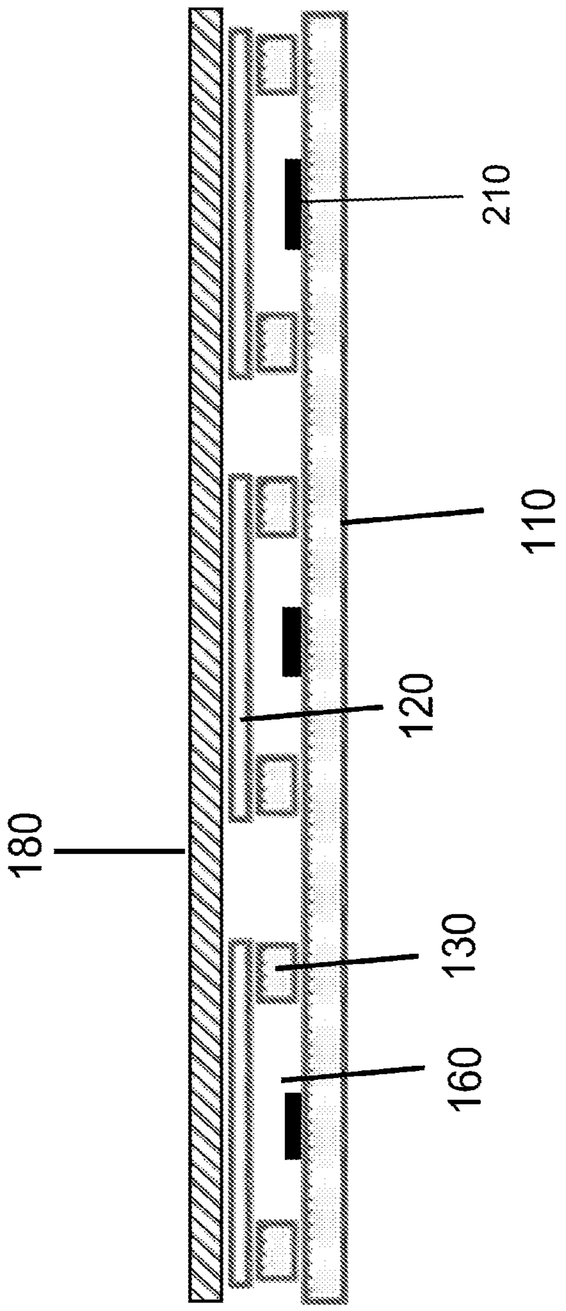
FIG. 1*b* illustrates a side view of a plurality of reaction chambers.
Figure 1C:
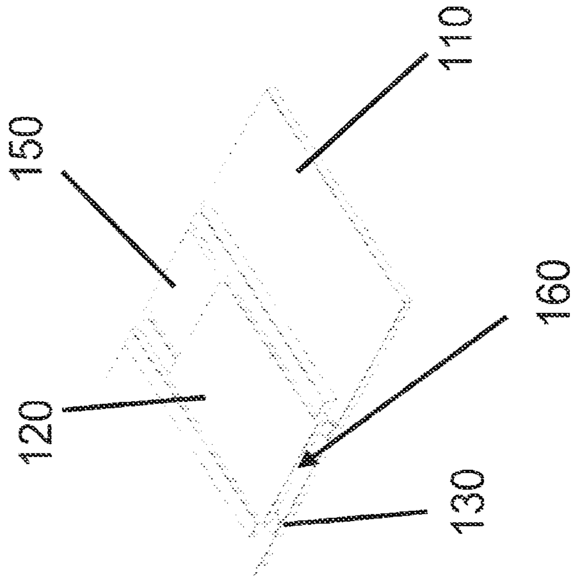
FIG. 1*c* illustrates an angle view of a single reaction chamber.

In some embodiments, the apparatus may comprise a press plate 180, for instance as shown in FIG. 1*b*. The press plate 180 may be located on top of the solid planar cover or otherwise added to the top of the solid planar cover. The press plate 180 may exert pressure on the solid planar cover. The exertion of pressure may aid or help seal the contact between the spacing strips, the solid planar cover, and the solid planar support.

In some embodiments, a support can comprise a reagent. A reagent can be a reagent for an assay, such as a staining assay, an ISH assay, a FISH assay, an immunohistochemical assay, an immunofluorescence assay, or another assay provided herein. For example, a support can comprise one or more of a detection reagent, a fixative, a buffer, a capture agent (e.g., an oligonucleotide, protein, enzyme, or antibody or antigen binding fragment thereof). In some embodiments, a reagent on a support can be chemically attached to the support. In some embodiments, a reagent on a support can be directly or indirectly linked to the support.

A cover can comprise any acceptable material, such as a solid material. In some embodiments, a solid material can comprise a polymer, glass, plastic, metal, or another solid material. In some embodiments, a cover can comprise a film or a gel. In some embodiments, a cover can comprise a coverslip, such as a glass coverslip.

The channel 160 formed can have a distance between the first opening and the second opening of at least 1 mm, at least 5 mm, at least 10 mm, at least 20 mm, at least 30 mm, at least 40 mm, at least 50 mm, at least 60 mm, at least 70 mm, at least 80 mm, at least 90 mm, at least 100 mm, at least 150 mm, or at least 200 mm. The channel formed can have a distance between the first opening and the second opening of not more than 1 mm, not more than 5 mm, not more than 10 mm, not more than 20 mm, not more than 30 mm, not more than 40 mm, not more than 50 mm, not more than 60 mm, not more than 70 mm, not more than 80 mm, not more than 90 mm, not more than 100 mm, not more than 150 mm, or not more than 200 mm. The channel formed can have a distance between the first opening and the second opening of about 1 mm, about 5 mm, about 10 mm, about 20 mm, about 30 mm, about 40 mm, about 50 mm, about 60 mm, about 70 mm, about 80 mm, about 90 mm, about 100 mm, about 150 mm, about 200 mm, or a range between any two foregoing values. For example, the channel formed can have a distance between the first opening and the second opening from 1 mm to 100 mm.

The distance from the support to the cover can be at least about 1 μm, at least about 5 μm, at least about 10 μm, at least about 25 μm, at least about 50 μm, at least about 75 μm, at least about 100 μm, at least about 200 μm, at least about 300 μm, at least about 400 μm, at least about 500 μm, at least about 1 mm, at least about 2 mm, at least about 3 mm, at least about 4 mm, or at least about 5 mm. In some cases, the distance from the support to the cover can be not more than about 1 μm, not more than about 5 μm, not more than about 10 μm, not more than about 25 μm, not more than about 50 μm, not more than about 75 μm, not more than about 100 μm, not more than about 200 μm, not more than about 300 μm, not more than about 400 μm, not more than about 500 μm, not more than about 1 mm, not more than about 2 mm, not more than about 3 mm, not more than about 4 mm, or not more than about 5 mm. In some cases, the distance from the support to the cover can be about 1 μm, about 5 μm, about 10 μm, about 25 μm, about 50 μm, about 75 μm, about 100 μm, about 200 μm, about 300 μm, about 400 μm, about 500 μm, about 1 mm, about 2 mm, about 3 mm, about 4 mm, about 5 mm, or a range between any two foregoing values. For example, the distance from the support to the cover can be 5 μm to about 500 μm.

The cover can be configured to cover a portion of or all of the support. In some embodiments, the support can be configured to allow an overhang 150 between the support and the cover. For example, at one or both ends of the channel, the support can be longer than the cover, or the cover can be longer than the support. In some embodiments, for example, an overhang can be an overhang of the support (i.e., the support can be longer than the cover, e.g., at the first opening, at the second opening, or at both the first opening and the second opening). In some embodiments, the overhang can be an overhang of the solid planar cover (i.e., the cover can be longer than the support, e.g., at the first opening, at the second opening, or at both the first opening and the second opening). In some embodiments, the overhang can be positioned at the first opening.

In some embodiments, an overhang 150 can be at least 0.1 mm, at least 0.5 mm, at least 1 mm, at least 2 mm, at least 3 mm, at least 4 mm, at least 5 mm, or at least 10 mm long. In some embodiments, an overhang can be not more than 0.1mm, not more than 0.5 mm, not more than 1 mm, not more than 2 mm, not more than 3 mm, not more than 4 mm, not more than 5 mm, or not more than 10 mm long. In some embodiments, an overhang can be about 0.1 mm, about 0.5 mm, about 1 mm, about 2 mm, about 3 mm, about 4 mm, about 5 mm, or about 10 mm long, or a range between any two foregoing values. For example, in some cases the overhang can be from 1 mm to 10 mm long.

An apparatus provided herein can further comprise at least one rack 140 connected to the reaction chamber. Such a rack can be configured to hold the reaction chamber, for example at a prescribed incline or angle (e.g., with the first opening positioned higher than the second opening). In some embodiments, the reaction chamber can be at an incline of at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, or at least 85 degrees with respect to the gravity vector of the Earth. In some embodiments, reaction chamber can be at an incline of not more than 5 degrees, not more than 10 degrees, not more than 15 degrees, not more than 20 degrees, not more than 25 degrees, not more than 30 degrees, not more than 35 degrees, not more than 40 degrees, not more than 45 degrees, not more than 50 degrees, not more than 55 degrees, not more than 60 degrees, not more than 65 degrees, not more than 70 degrees, not more than 75 degrees, not more than 80 degrees, or not more than 85 degrees with respect to the gravity vector of the Earth. In some embodiments, the reaction chamber can be at an incline of about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, or about 85 degrees with respect to the gravity vector of the Earth, or a range between any two foregoing values. For example, the reaction chamber can be at an incline of about 5-85 degrees with respect to the gravity vector of the Earth.

A portion of or all of the reaction chamber can be affixed to the rack. The reaction chamber can be permanently or removably affixed to the rack. In some embodiments, the reaction chamber can be not removable (e.g., permanently affixed to) from the at least one rack.

In some embodiments, the reaction chamber can be slidably affixed to the rack, for example via sliders. In some such embodiments, for example, the reaction rack can comprise at least one sliding mechanism onto which the reaction chamber can attach. In some embodiments, a sliding mechanism can comprise a channel or a cutout of the rack which can fit a ledge, hook, raised portion, or other edge or surface feature of the reaction chamber. In some embodiments, a sliding mechanism can comprise a channel or cutout of the reaction chamber which can fit a ledge, hook, raised portion, or other edge or surface feature of the rack. In some embodiments, a sliding mechanism can comprise a mechanical slider on the rack that can attach to an attachment feature on the reaction chamber. In some embodiments, a sliding mechanism can comprise a mechanical slider on the reaction chamber that can attach to an attachment feature on the rack.

In some embodiments, a rack can comprise an attachment feature that can attach to a reaction chamber provided herein. An attachment feature can comprise a slider, a snap, a button, a channel, a groove, a ledge, a solid surface, or other attachment feature. An attachment feature can be configured to support the reaction chamber at an angle of 5-85 degrees with respect to the gravity vector of the Earth, such as any angle provided herein. In some embodiments, an attachment feature can be adjustable. For example, the angle at which the attachment feature can support the reaction chamber with respect to the gravity vector of the Earth can be adjusted, for example, within the range of 5 degrees and 85 degrees or a range between any two angles between 5 and 85 degrees with respect to the gravity vector of the Earth, such as any angle or range of angles provided herein.

In some embodiments the channel (e.g., of the reaction chamber) can be flanked by sliders. The sliders can be in the channel (i.e., between the at least two spacing strips) or outside the channel (e.g., on the side of the two spacing strips opposite the channel). Sliders can be affixed, for example, to one or more of the two spacing strips, to the support, or to the cover. The sliders can be configured to allow the at least one reaction chamber to slidably attach to the at least one rack. In some embodiments, the sliders can be configured to slidably attach the reaction chamber to one of the at least one rack.

Figure 2A:
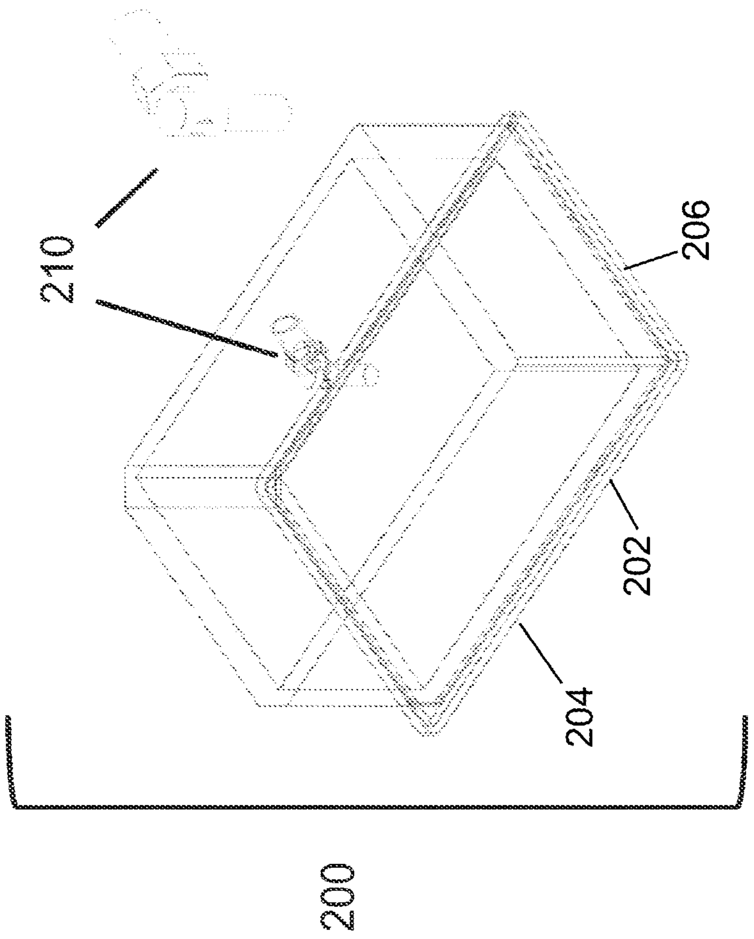
FIG. 2*a* illustrates a container having a vacuum port on the side of the container.
Figure 2B:
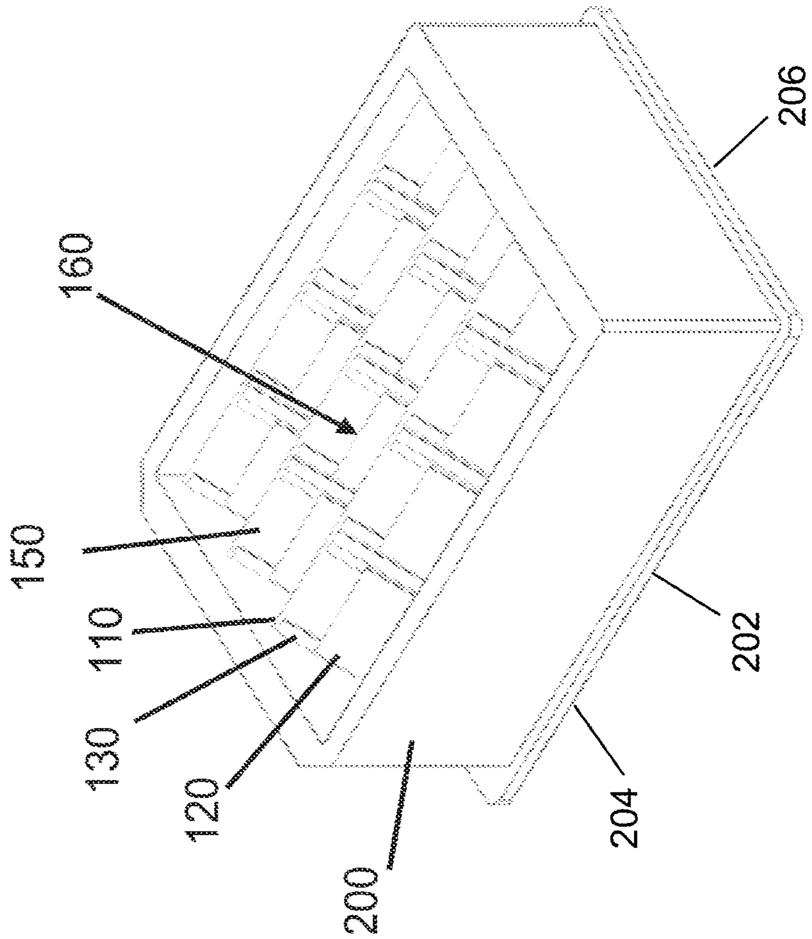
FIG. 2*b* illustrates a rack holding a plurality of reaction chambers at an angle in a container.

In some embodiments, the apparatus can further comprise at least one container 200 having a base 202 with a length 204 and a width 206. The container can be an open-top container. An illustration of an open-top container 200 is provided in FIG. 2*a*. The at least one rack can be inserted into the at least one container, for example as illustrated in FIG. 2*b*. In some embodiments, the at least one rack can be removable from inside the at least one container. For example, the at least one rack can be configured to snap into and/or out of the at least one container. In some embodiments, the at least one rack can fit loosely into the container. In some embodiments, the at least one rack can be configured to slide into the container. In some embodiments, the at least one rack can be not removable from inside the at least one container.

The container can be at least as large as the at least one rack. In some embodiments, the container can be larger than at least one of the at least one rack. For example, the container can have a length, width, or height hat is larger than that at least one of the at least one rack.

In some embodiments, the base 202 of the container can be at least 50 mm, at least 75 mm, at least 100 mm, at least 125 mm, at least 150 mm, at least 175 mm, at least 200 mm, at least 225 mm, at least 250 mm, at least 275 mm, at least 300 mm, at least 400, or at least 500 mm long. In some embodiments, the base 202 of the container can be not more than 50 mm, not more than 75 mm, not more than 100 mm, not more than 125 mm, not more than 150 mm, not more than 175 mm, not more than 200 mm, not more than 225 mm, not more than 250 mm, not more than 275 mm, not more than 300 mm, not more than 400 mm, or not more than 500 mm long. In some embodiments, the base 202 of the container can be about 50 mm, about 75 mm, about 100 mm, about 125 mm, about 150 mm, about 175 mm, about 200 mm, about 225 mm, about 250 mm, about 275 mm, about 300 mm, about 400 mm, or about 500 mm long, or a range between any two foregoing values. In some embodiments, the base 202 of the container can be from 127 mm to 128 mm long.

In some embodiments, the base 202 of the container can be at least 25 mm, at least 50 mm, at least 75 mm, at least 100 mm, at least 125 mm, at least 150 mm, at least 175 mm, at least 200 mm, at least 225 mm, at least 250 mm, at least 275 mm, at least 300 mm, at least 400, or at least 500 mm wide. In some embodiments, the base 202 of the container can be not more than 25 mm, not more than 50 mm, not more than 75 mm, not more than 100 mm, not more than 125 mm, not more than 150 mm, not more than 175 mm, not more than 200 mm, not more than 225 mm, not more than 250 mm, not more than 275 mm, not more than 300 mm, not more than 400 mm, or not more than 500 mm wide. In some embodiments, the base 202 of the container can be about 25 mm, about 50 mm, about 75 mm, about 100 mm, about 125 mm, about 150 mm, about 175 mm, about 200 mm, about 225 mm, about 250 mm, about 275 mm, about 300 mm, about 400 mm, or about 500 mm wide, or a range between any two foregoing values. In some embodiments, the base 202 of the container can be from 85 mm to 86 mm wide.

In some embodiments, the container can be at least 1 mm, at least 10 mm, at least 25 mm, at least 50 mm, at least 75 mm, at least 100 mm, at least 125 mm, at least 150 mm, at least 175 mm, at least 200 mm, at least 225 mm, at least 250 mm, at least 275 mm, at least 300 mm, at least 400, or at least 500 mm high. In some embodiments, the container can be not more than 1 mm, not more than 10 mm, not more than 25 mm, not more than 50 mm, not more than 75 mm, not more than 100 mm, not more than 125 mm, not more than 150 mm, not more than 175 mm, not more than 200 mm, not more than 225 mm, not more than 250 mm, not more than 275 mm, not more than 300 mm, not more than 400 mm, or not more than 500 mm high. In some embodiments, the container can be about 1 mm, about 10 mm, about 25 mm, about 50 mm, about 75 mm, about 100 mm, about 125 mm, about 150 mm, about 175 mm, about 200 mm, about 225 mm, about 250 mm, about 275 mm, about 300 mm, about 400 mm, or about 500 mm high, or a range between any two foregoing values. In some embodiments, the container can be from 10 mm to 250 mm high.

In some embodiments, the apparatus can further comprise a reactive material 210. A reactive material 210 can be a solid reactive material. The reactive material 210 can be affixed to the support. In some such cases, the reactive material can be in the channel (e.g., affixed to the side of the support facing the cover).

A reactive material can comprise a sample, such as a biological sample. A biological sample can be fresh, frozen, or fixed. A biological sample can be of animal, plant, bacteria, fungus, or protist origin. In some cases, a biological sample can be that of a human, mouse, rat, cow, pig, sheep, monkey, rabbit, fruit fly, frog, nematode or woodchuck. A biological sample can comprise cultured cells, biological tissue, biological fluid, a homogenate, or an unknown biological sample. In some cases, a biological sample can comprise a virus, a viral vector or a prion.

A reactive material (e.g., a biological sample) can be affixed to the support or the cover, wherein the reactive material is in the channel. The reactive material sample may be fixed using formalin, formaldehyde, another aldehyde, an alcohol, an oxidizing agent, a mercurial, a picrate, or HOPE fixative. The biological sample may alternatively be fixed using heat fixation. In some cases, the reactive material can be formalin-fixed, paraffin-embedded (FFPE). Fixation may be achieved via immersion or perfusion. The reactive material may be frozen. In some cases, the reactive material may be frozen at less than 0° C., less than −10 ° C., less than −20 ° C., less than −30° C., less than −40 ° C., less than −50 ° C., less than −60 ° C., less than −70 ° C., or less than −80 ° C.

A biological sample can comprise a biological feature of interest. A biological feature of interest can comprise any part of a sample which can be measured using methods described herein. In some cases, a biological feature of interest can comprise a part of a sample that can be indicated by binding to a capture agent. In some cases, a biological feature of interest can comprise a part of a sample indicated by a histological method, such as immunohistochemical method, an immunohistofluorescence method, an immunostaining method, or a staining method. In some cases, a biological feature of interest can be a feature of interest for diagnostic, drug discovery, research, identification, or optimization purposes. In some cases, a biological feature of interest can be an antigen. In some cases, a biological feature of interest can comprise a cell wall, a nucleus, cytoplasm, a membrane, keratin, a muscle fiber, collagen, bone, a protein, a nucleic acid (e.g., mRNA or genomic DNA, etc), fat, etc. A biological feature of interest can also be indicated by immunohistological methods, e.g., using a capture agent that is linked to an oligonucleotide.

In some embodiments, an apparatus provided herein can further comprise a lid 400. The lid 400 can be removably attached to the top of the at least one container 200. In some embodiments, a lid 400 can be configured to snap, screw, or fit snugly onto the at least one container 200. In some embodiments, a lid can be hingably attached to the at least one container.

Figure 4:
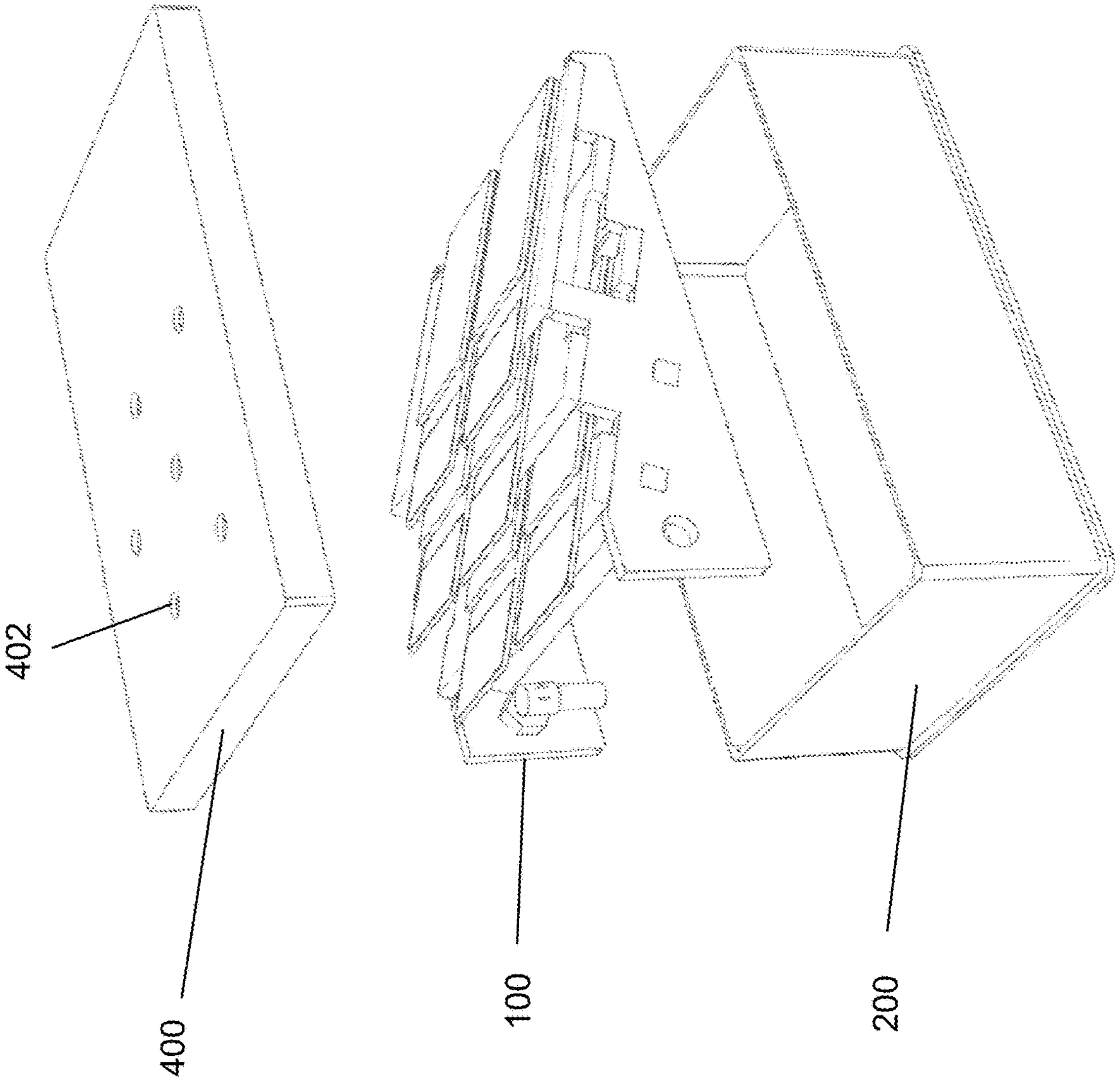
FIG. 4 illustrates a rack holding a plurality of reaction chambers at an angle, oriented in a fashion where it can be placed a container, and a lid comprising a plurality of perforations, oriented in a fashion where it can be placed on the container.

A lid 400 can have a perforation 402. In some embodiments, a lid 400 can have a plurality of perforations 402. In some embodiments, a perforation 402 can be vertically aligned with the first opening of the at least one semi-open reaction chamber 100. In some embodiments, a plurality of perforations 402 can be vertically aligned with the first opening of a reaction chamber 100. In some embodiments, all of the plurality of perforations can be vertically aligned with the first opening of a reaction chamber. An example of a lid 400 comprising perforations 402 configured to vertically align with the first openings of reaction chambers 100 is provided in FIG. 4.

In some embodiments, a lid can comprise an additional opening. The additional opening can be positioned so that it does not vertically align with the planar support of any of the at least one semi-open reaction chambers.

In some embodiments, a lid can comprise one or more nozzles, such as liquid nozzles. Each nozzle can comprise an outlet. One or more of the nozzles can be affixed to the lid in a position that can allow the outlet end of each nozzle to be vertically aligned with the first opening of one of the at least one reaction chambers.

Figure 5:
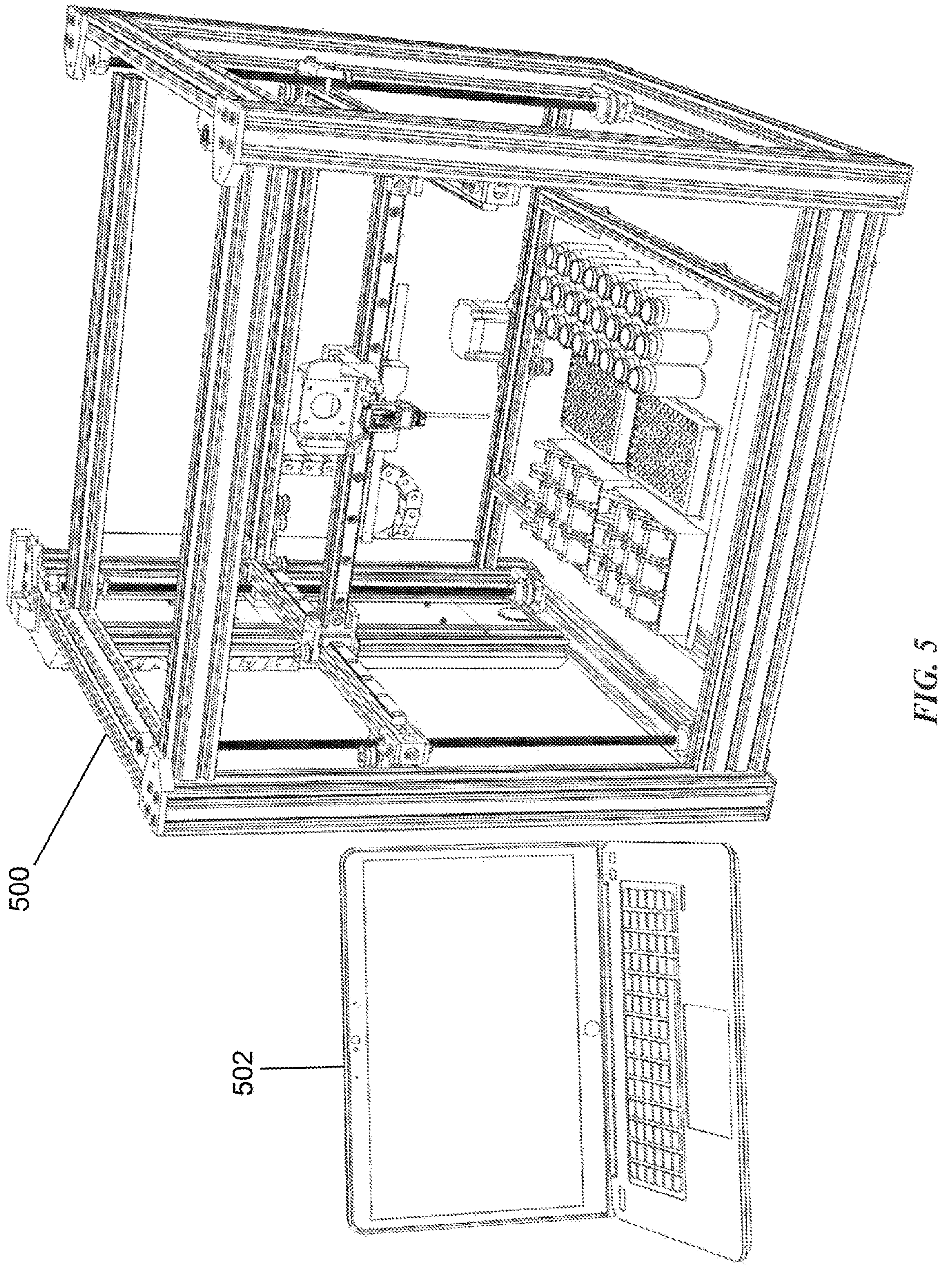
FIG. 5 illustrates a system where a rack holding a plurality of reaction chambers at an angle in a container is used with a liquid handler to deliver liquid to one or more reaction chambers, and a computer to control the liquid handler.

An apparatus can be further configured to be inserted into a liquid handler 500, such as an automatic liquid handler. An example of an apparatus 100 inserted into a liquid handler 500 is provided in FIG. 5. In some embodiments, the liquid handler 500 can be attached to a computer 502. In some embodiments, the liquid handler 500 can be controlled by a computer 502. An automatic liquid handler can comprise at least one moveable arm and at least one liquid dispensing nozzle attached to the at least one moveable arm. In some embodiments, an automatic liquid handler can comprise 2, 3, 4, 5, 10, 20, or more moveable arms, or a range between any two foregoing values. In some embodiments, any one or more of, or all of, the moveable arms can have a nozzle attached. A nozzle attached to a moveable arm can be configured to deliver liquid to a semi-open reaction chamber, for example through the first opening of the semi-open reaction chamber. In some embodiments, a nozzle attached to a moveable arm can be configured to deliver liquid to a semi-open reaction chamber through a perforation in the lid.

The at least one moveable arm can be moveable in 1 dimension, 2 dimensions, or 3 dimensions. The at least one moveable arm can be moveable in one or more of the x plane, the y plane, or the z plane. For example, the at least one moveable arm can be moveable in the x plane, the y plane, the z plane, the x and y planes, the x and z planes, the y and z planes, or the x, y, and z planes. In some embodiments, the at least one moveable arm can be radially moveable.

In some embodiments, a dispensing nozzle can be configured to utilize or use one or more tips. Examples of tips can include pipette tips or disposable tips. In some embodiments, tips can supply one or more liquids to at least one semi-open reaction chamber, in some cases via a first opening of the at least one semi-open reaction chamber.

In some embodiments, an apparatus can further comprise a vacuum port 210 affixed to the open-top container. A vacuum port can be configured to attach (e.g., permanently or removably) to a vacuum apparatus. In some embodiments, a vacuum port can be configured to allow removal of liquid from the open-top container.

In some embodiments, an apparatus can further comprise a waste evacuation channel. A waste evacuation channel can be affixed to a semi-open reaction chamber or to the semi-open top container. A waste evacuation channel can be configured for the removal of liquids (e.g., liquid reagents) from the semi-open reaction chamber, such as by gravity, centrifugation, vacuum, or another force.

In some embodiments, an apparatus provided herein can be configured to be inserted into a 3D printer, The 3D printer can be configured to deliver reagents, such as reagents for an immunohistochemical, immunofluorescence, immunostaining, or chemical staining assay to the semi-open reaction chamber. In some embodiments, such reagents can be delivered so they contact a solid reactive material, such as a biological sample, in the semi-open reaction chamber. In some embodiments, a 3D printer can comprise a moveable arm, such as a 3D moveable arm, that can in some cases be configured to deliver reagents to the semi-open reaction chamber or a solid reactive material in the semi-open reaction chamber.

Methods

Provided herein are methods for use of apparatuses and kits described herein. Methods can be, for example, for performing histological techniques, such as those provided herein. Methods can comprise dispensing of a first liquid into or onto the overhang of a semi-open reaction chamber of an apparatus provided herein. A first liquid can be, for example, a reagent for a histological technique such as a histological technique provided herein.

A method can further comprise dispensing a second liquid onto or into the overhang of a semi-open reaction chamber of an apparatus provided herein. A second liquid can be, for example, a reagent for a histological technique such as a histological technique provided herein. In some embodiments, a second liquid can be a reagent in a histological protocol that can be applied to a solid reactive material, such as a biological sample, after the first liquid.

Upon dispensing of a second liquid, the first liquid can exit the semi-open reaction chamber. For example, the first liquid can exit the semi-open reaction chamber through the second opening of the semi-open reaction chamber. In some embodiments, the first liquid can exit through a waste evacuation channel. In some embodiments, a vacuum can be used to remove the first liquid after the first liquid exits the semi-open reaction chamber (e.g., through the second opening). For example, a vacuum can be applied to a vacuum port of the open top container to draw the first liquid out of the semi-open reaction chamber.

Methods provided herein can be used to perform assays, such as histological assays. Histological assays can comprise electron microscopy, historadiography assays, histochemical assays, immunohistochemical assays, immunofluorescence assay, immunostaining assays, in situ hybridization assays, or other types of assays. Liquids (e.g., a first liquid and/or a second liquid) applied to the overhang can be liquids for such assays. A liquid can comprise a fixing agent, a stain, a buffer (e.g., a wash buffer), a binding agent (e.g., an antibody or antigen binding fragment thereof, or other protein capable of binding a biological feature of interest, or a nucleic acid such as an oligonucleotide, a ribonucleic acid (RNA) molecule, or a deoxyribonucleic acid (DNA) molecule), a label, or a reagent for label activation and/or detection.

A first liquid or a second liquid can comprise a fixative, such as a chemical fixative. A chemical fixative can be used to preserve or maintain the structure of tissues and cells. In some embodiments, fixation can harden a tissue. A fixative can generally preserve tissues or cells, for example by irreversibly cross-linking proteins. In some cases, a fixative can comprise formalin, paraformaldehyde, or formaldehyde. For example, a fixative can comprise 10% neutral buffered formalin, or NBF (4% formaldehyde in phosphate buffered saline). In some cases, a fixative can glutaraldehyde, for example as a 2.5% solution in phosphate buffered saline. Other fixatives can comprise osmium tetroxide or uranyl acetate.

In some embodiments, a first liquid or a second liquid can comprise a reagent for staining, for example a stain. In some embodiments, a stain can be applied to provide contrast to a reactive material such as a biological sample, for example for microscopic analysis.

Examples of stains can include hematoxylin and eosin, which can be used to show the general structure to tissue. Hematoxylin can stain cell nuclei blue, while eosin can stain cytoplasm or other components of a solid reactive material pink.

Other examples of stains can include more selective stains, which can selectively stain cells, cellular components, or specific substances. Other stains can include Prussian blue, Nissi substance, silver stains, or other stains.

In some embodiments, a first liquid or a second liquid can comprise a reagent for historadiography. In some embodiments, a liquid that is a reagent for historadiography can comprise a radiological substance, for example a nuclear tract emulsion.

A first liquid or a second liquid can comprise a reagent for an immunohistochemistry, immunofluorescence, or immunostaining assay, for example an antibody. An antibody can be a primary antibody (e.g., that can be specific for a biological feature of interest) or a secondary antibody (e.g., that can be specific for a primary antibody).

A first liquid or a second liquid can comprise a reagent for electron microscopy. A reagent for electron microscopy can comprise one or more heavy metals that can be used to stain a sample. Examples of reagents for electron microscopy can include uranyl acetate and lead citrate.

A first liquid or a second liquid can comprise a reagent for an in situ hybridization assay. A reagent for an in situ hybridization assay can include a binding agent configured to bind to a nucleic acid molecule of the solid reactive material such as a biological sample (e.g., RNA or DNA). For example, a reagent for an in situ hybridization assay can comprise an oligonucleotide or other nucleic acid molecule (e.g., RNA or DNA).

In some embodiments, a first liquid or a second liquid can comprise a reagent for a step or a method described in Alturkistani H A, Tashkandi F M, Mohammedsaleh Z M. Histological Stains: A Literature Review and Case Study. *Glob J Health Sci.* 2015; 8(3):72-79. Published 2015 Jun. 25. doi:10.5539/gjhs.v8n3p72, which is incorporated by reference in its entirety herein.

Kits

Provided herein are kits for the controlled application of fluid to a surface. In some embodiments, a kit can comprise one or more components of an apparatus provided herein. In some embodiments, a kit can comprise a reagent for a method provided herein.

A kit can comprise at least two spacing strips affixed to one side of a support. A support can be a support provided herein, such as a slide. The at least two spacing strips can be solid. In some embodiments, the at least two spacing strips can comprise a gel.

A kit can cover configured to attach to the at least two spacing strips opposite the solid planar support. When attached to the at least two parallel spacing strips, the solid planar cover can (along with the at least two parallel spacing strips and solid planar support) form a channel, which can comprise a first opening at a first end of the channel and a second opening at a second end of the channel with an overhang between the solid planar support and the solid planar cover. The channel can be, for example, as provided herein. For example, the channel can have a distance between the first opening and the second opening of any length provided herein, for example from 1 mm to 100 mm. In some embodiments, the distance from the solid planar support to the solid planar cover (i.e. in the channel) can be of any distance provided herein, for example from 5 μm to 100 μm. In some embodiments, the length of the overhang can be any dimension provided herein, for example from 1 mm to 10 mm long. The overhang can be positioned at the first opening. In some embodiments, the overhang can be an overhang of the solid planar support. In some embodiments, the overhang can be an overhang of the solid planar cover.

In some embodiments, the channel can be flanked by sliders, as provided above. The sliders can be configured to allow the at least one semi-open reaction chamber to slidably attach to the at least one rack.

In some embodiments, a kit can further comprise at least one rack. The at least one rack can be configured to connect to the reaction chamber such that the channel of at least one of the at least one semi-open reaction chamber can be at an incline of about 5-85 degrees with respect to the gravity vector of the Earth. The first opening can be positioned higher than the second opening when the at least one reaction chamber is positioned in the at least one rack. In some embodiments, the at least one reaction chamber can be affixed to the at least one rack.

A kit can further comprise at least one open-top container configured to contain the at least one rack. The open-top container can be an open-top container as provided herein. In some embodiments, the at least one rack can be configured to snap into the open-top container. In some embodiments, the at least one rack can be configured to fit loosely into the open-top container. The open-top container can have any dimensions of an open-top container provided herein. For example, an open-top container can be from 127 mm to 128 mm long, from 85 mm to 86 mm wide, or from 10 mm to 250 mm high.

A kit can further comprise a lid. In some embodiments, a lid can have a plurality of perforations. In some embodiments, one of the plurality of perforations can be configured to vertically align with the first opening of one of the at least one semi-open reaction chamber when the lid is attached to the top of the at least one open-top container. The lid can be configured to removably attach to the top of the at least one open-top container. In some embodiments, a lid can comprise an additional opening, for example as provided herein. An additional opening can be configured to not vertically align with the planar solid support of any of the at least one semi-reaction chambers.

In some embodiments, a kit can further comprise one or more liquid nozzles. Each nozzle can have an outlet. One or more nozzles can be affixed to the lid, for example in a position that can allow the outlet end of each nozzle to be vertically aligned with the first opening of the at least one semi-open reaction chamber.

In some embodiments, a kit can further provide instructions. Instructions can comprise instructions for assembling an apparatus provided herein using a kit, or for performing a method provided herein using a kit.

Computer Systems

Figure 3:
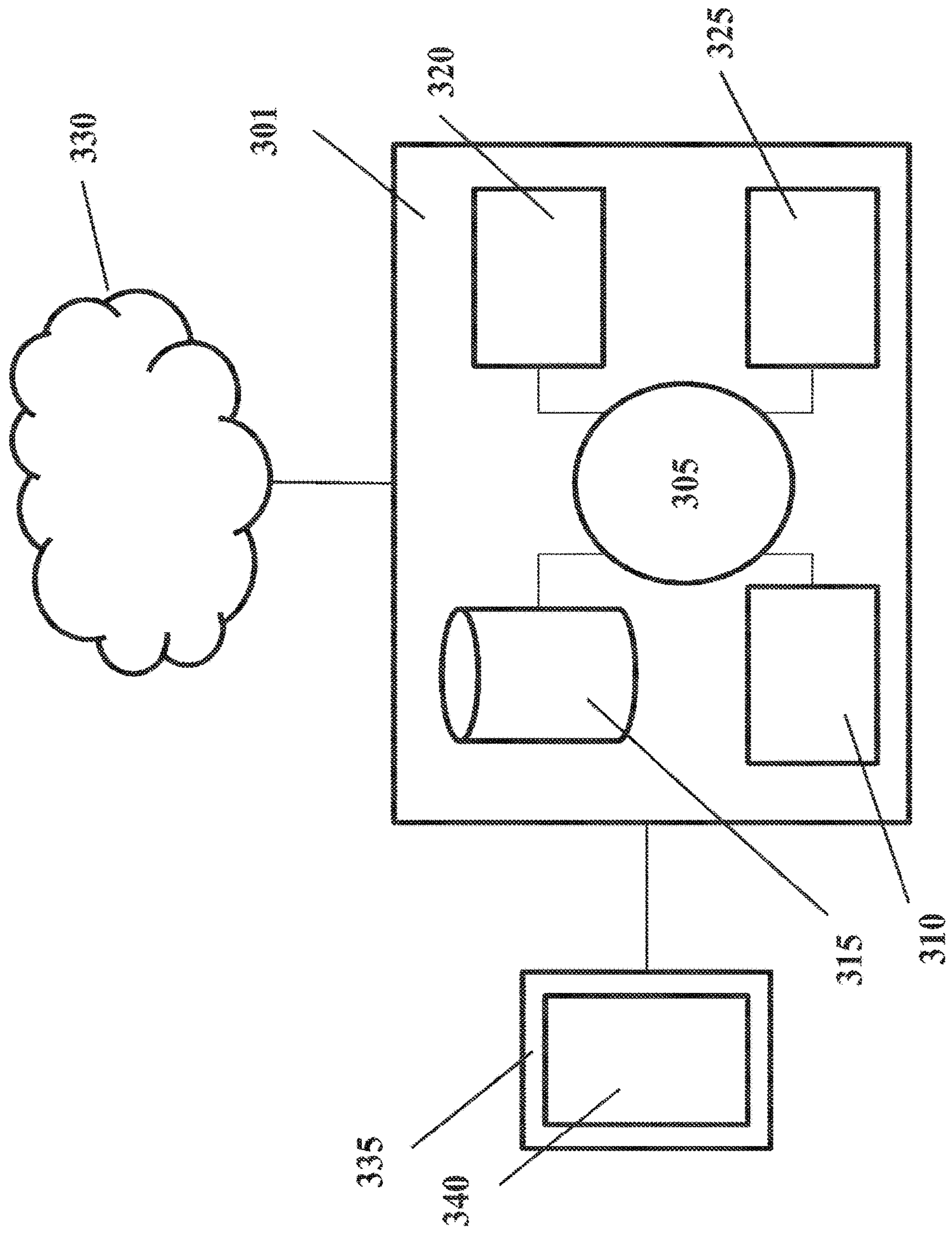
FIG. 3 illustrates a schematic of a system that can be used to carry out methods provided herein.

The present disclosure provides computer systems that are programmed to implement methods of the disclosure. FIG. 3 shows a computer system 301 that is programmed or otherwise configured to deliver liquid reagents to an apparatus described herein. The computer system 301 can regulate various aspects of methods of the present disclosure, such as, for example, dispensing a liquid onto an overhang of an apparatus, or using a vacuum to remove a liquid after the liquid exits the second opening. The computer system 301 can be an electronic device of a user or a computer system that is remotely located with respect to the electronic device. The electronic device can be a mobile electronic device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An apparatus for iterative exchange of liquid reagents, the apparatus comprising:

(a) at least one open reaction chamber comprising a solid planar cover, at least two parallel spacing strips, and a solid planar support;

wherein the at least two parallel spacing strips have a length and a first surface affixed to the solid planar support;

wherein the solid planar cover is affixed to the at least two parallel spacing strips on a second surface of the at least two parallel spacing strips opposite the first surface, thereby forming a channel comprising a first opening at a first end of the channel and a second opening at a second end of the channel;

wherein the first surface of the at least two parallel spacing strips affixed to the solid planar support has higher tack than the second surface of the at least two parallel spacing strips affixed to the solid planar cover, or vice versa; and wherein a dimension of the solid planar support in a direction parallel to the length of the at least two parallel spacing strips is greater than a dimension of the solid planar cover in the direction parallel to the length of the at least two parallel spacing strips, such that the solid planar support extends further than the solid planar cover, thereby forming an overhang; and (b) at least one rack connected to the at least one open reaction chamber, wherein when positioned upright for use for iterative exchange of liquid reagents, the channel of the at least one open-reaction chamber in (a) is at an angle of 5-85 degrees with respect to the gravity vector of the Earth, with the first opening positioned higher than the second opening.

2. The apparatus of claim 1, further comprising a press plate on top of the solid planar cover that exerts pressure on the solid planar cover.

3. The apparatus of claim 1, further comprising at least one open-top container comprising a base having a length and a width; wherein at least one of the at least one rack is inside the at least one open-top container.

4. The apparatus of claim 3, wherein the base of the at least one open-top container is from 127 mm to 128 mm long.

5. The apparatus of claim 3, wherein the base of the at least one open-top container is from 85 mm to 86 mm wide.

6. The apparatus of claim 1, further comprising a solid reactive material, wherein the solid reactive material is affixed to the solid planar support, and wherein the solid reactive material is in the channel.

7. The apparatus of claim 6, wherein the solid reactive material comprises a biological sample.

8. The apparatus of claim 3, further comprising a lid having a plurality of perforations; wherein the lid is removably attached to the top of the at least one open-top container.

9. The apparatus of claim 8, wherein one of the plurality of perforations is vertically aligned with the first opening of one of the at least one open reaction chamber.

10. A system for the iterative exchange of liquid reagents comprising:

(a) the apparatus of claim 1;

(b) an automatic liquid handler; and (c) a computer.

11. The system of claim 10, wherein the automatic liquid handler is configured to siphon a liquid from a reservoir.

12. A method for the iterative exchange of liquid reagents using the system of claim 10, the method comprising the automatic liquid handler dispensing a first liquid onto the overhang.

* * * * *